United States Patent [19]

Müller

[11] Patent Number: 4,703,432

[45] Date of Patent: Oct. 27, 1987

[54] ELECTRONIC CONTROL DEVICE FOR INDUSTRIAL SEWING MACHINES

[75] Inventor: Ernst Müller, Tübach, Switzerland

[73] Assignee: Helmut Schips, Switzerland

[21] Appl. No.: 680,827

[22] Filed: Dec. 12, 1984

[30] Foreign Application Priority Data

Dec. 15, 1983 [EP] European Pat. Off. ........ 83112598.4

[51] Int. Cl.$^4$ ...................... G06F 15/46; D05B 19/00
[52] U.S. Cl. .............................. 364/470; 112/121.11;
112/457; 112/458; 364/191; 364/400
[58] Field of Search ........ 364/130, 400, 470, 191–193;
112/121.11, 121.12, 453, 456, 457, 458, 445

[56] References Cited

U.S. PATENT DOCUMENTS

| | | | |
|---|---|---|---|
| 4,051,794 | 10/1977 | Herzer et al. | 112/121.12 |
| 4,069,778 | 1/1978 | Kozawa | 112/121.12 |
| 4,085,691 | 4/1978 | Coughenour et al. | 112/457 |
| 4,092,937 | 6/1978 | Landau, Jr. et al. | 112/121.11 |
| 4,092,938 | 6/1978 | Coughenour et al. | 112/457 |
| 4,160,422 | 7/1979 | Barber et al. | 112/121.11 |
| 4,280,424 | 7/1981 | Carbonato et al. | 112/445 |
| 4,301,753 | 11/1981 | Meier | 112/121.11 |
| 4,446,520 | 5/1984 | Shigeta et al. | 364/400 |
| 4,478,160 | 10/1984 | Ohniwa | 112/121.12 |
| 4,509,443 | 4/1985 | Martell et al. | 112/121.11 X |
| 4,520,745 | 6/1985 | Shinomiya et al. | 112/121.12 X |

Primary Examiner—Joseph Ruggiero
Attorney, Agent, or Firm—Wigman & Cohen

[57] ABSTRACT

An electronic control device for industrial sewing machines, which includes a microprocessor, a programmable fixed value memory, a read/write memory, a display and an entry keyboard. In order to be able to quickly and easily change the program according to which the sewing machine operates, the non-volatile read/write memory is arranged in a cassette provided with plug connector elements. The control device is provided with a cassette receptacle which includes plug receptacle elements which are formed and arranged to correspond to the plug connector elements.

10 Claims, 5 Drawing Figures

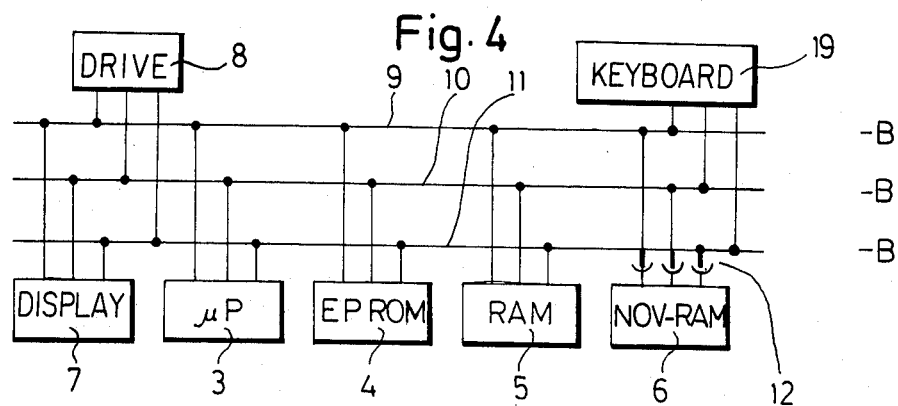
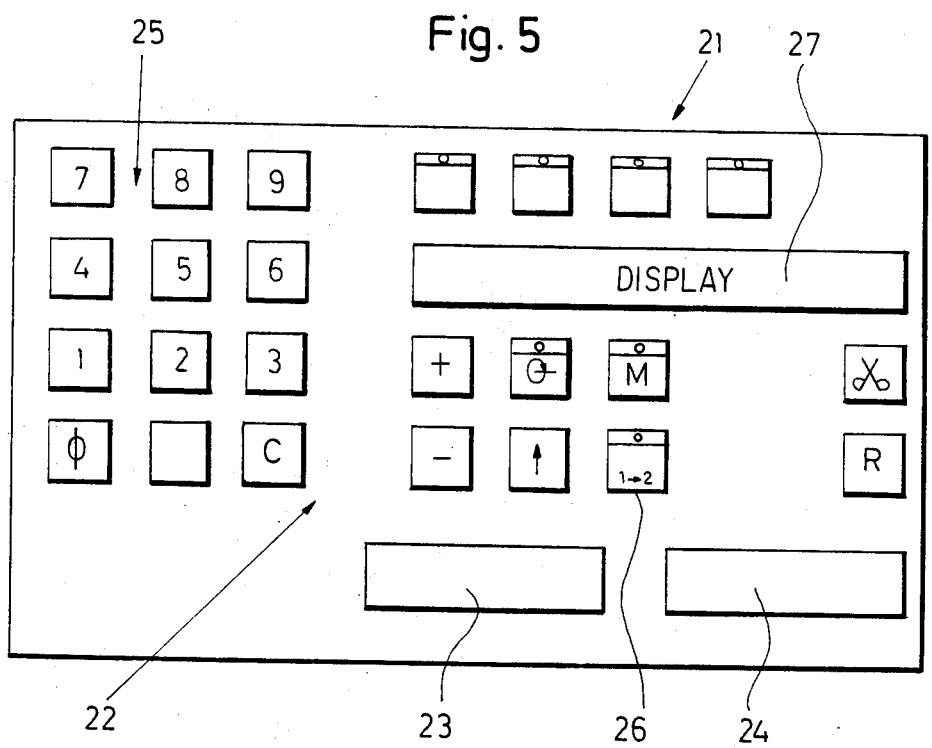

ELECTRONIC CONTROL DEVICE FOR INDUSTRIAL SEWING MACHINES

BACKGROUND OF THE INVENTION

The present invention relates to an electronic control device, and in particular, to an electronic control device for industrial sewing machines.

In prior art control devices of this type, which are usually located in a housing arranged on the sewing machine, all successively performed program steps must be entered by means of the keyboard. That is true not only when the program must be altered for a different article, but also for even a transition from one clothing size to another for the very same article. The disadvantages of utilizing such prior art control devices are not limited to the fact that the operator of the sewing machine, for example a seamstress, has difficulty in performing the programming or is not even capable of undertaking such a task. In addition, there is a relatively great danger that errors or mistakes will slip into the programming. A further, more serious disadvantage is that a relatively large amount of time is required to enter the new program, which results in a correspondingly large amount of time during which the machine is out of production.

SUMMARY AND OBJECTS OF THE INVENTION

It is an object of the present invention to create an electronic control device for use with industrial sewing machines, which makes it possible to shorten the periods of time during which the sewing machine is out of production due to programming work.

Another object of the present invention is to provide an electronic control device for use with industrial sewing machines which is easy to use.

A still further object of the present invention is to provide an electronic control device for use with industrial sewing machines which is simple and easy to manufacture.

Those objects and others are achieved by the instant invention which utilizes a non-volatile read/write memory, formed as an exchangable external memory. Thus, the switch-over of the sewing machine to a different operation requires simply an exchange of the external memory. The down time of the sewing machine due to a program change is thereby reduced to a minimum. In addition, the programming does not have to be performed by the operator of the sewing machine, but rather can be performed by a specialist at times other than during the production periods of the sewing machine. In view of those more favorable conditions under which the programming occurs, the danger of mistakes in the programming is reduced considerably. Also, the programming is not performed under the time pressure which is present when the programming must take place on a machine that is active in the manufacturing process.

In one preferred embodiment of the present invention, the read/write memory is arranged in a cassette provided with plug connector elements. In such an arrangement, the instant control device includes a cassette receptacle having plug connector receiving elements which are arranged to correspond to the plug connector elements. That greatly simplifies the handling of the memory.

The non-volatile read/write memory could be backed-up with a battery. In order to be able to store the program over any desired period of time without a control or maintenance of the buffer battery, however, in one preferred embodiment the memory is an unbufferred NOV-RAM.

The number of required read/write memories or cassettes can be significantly reduced by providing a read/write memory that includes at least one group of memories to store different stitch counts at different clothing sizes. Accordingly, for each article, it is necessary to have one cassette for each individual sewing machine unless all of the data for all clothing sizes of an article can be stored on a single cassette. The stitch count, which varies according to the size of the article of clothing, can thereby be stored in the individual memories of the memory group. After insertion of the cassette, one then need only enter or select the clothing size by means of the entry keyboard from the memory belonging to this clothing size. Since that entry requires only a small amount of time and also can be performed without mistakes by a person having no programming knowledge, that results in increasing the idle time of the sewing machine only slightly. Furthermore, it is useful to select the number of memories in one group such that with the largest possible number of different clothing sizes, at least one memory is available for each clothing size. In addition, it is advantageous for the number of memory groups to agree with the maximum possible number of program steps, so that one memory group is available for each program step.

Since the memories, which are collected in groups, as a rule only need to store stitch counts, the memories preferably have counters assigned to them.

In one preferred embodiment of the control device of the present invention, a programming device is also provided with a cassette receptacle which is formed in the same manner as the cassette receptacle of the portion of the control device arranged on the sewing machine. That type of separate programming device provides more than the advantage of location independence. It also provides the possibility of limiting the portion provided on the sewing machine to only absolutely necessary components, for example a simplified keyboard and display device. Thus, the programming device can be more sophisticated and expensive, for example with a higher level of operating comfort or user friendliness. The additional expense required therefor is obviously significantly lower than when that additional expense is incurred on every machine. In a preferred embodiment of the present invention, the programming device is provided with a second cassette receptacle in order to be able to readily and simply copy the program from one cassette onto another cassette.

BRIEF DESCRIPTION OF THE DRAWINGS

The invention is described in greater detail below with the aid of an examplary embodiment illustrated in the drawings, wherein:

FIG. 4 is a partially illustrated block circuit diagram of the examplary embodiment of the present invention; and FIG. 5 is a view of the front plate of an exemplary embodiment of a programming device according to the present invention.

DETAILED DESCRIPTION OF A PREFERRED EMBODIMENT

Figure 1:
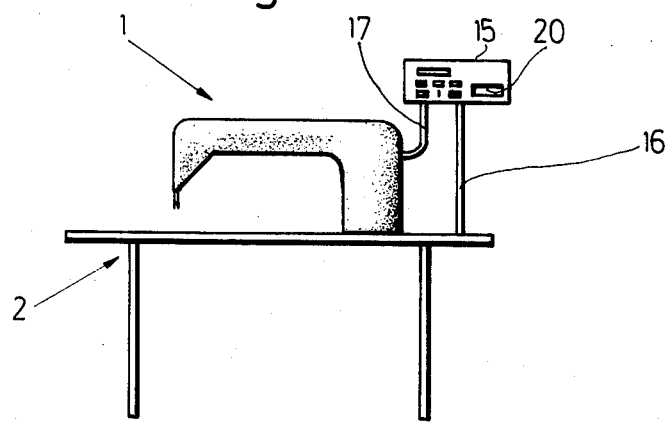
FIG. 1 is a schematically illustrated view of an industrial sewing machine with an exemplary embodiment of a portion of the control device according to the present invention rigidly connected to the sewing machine.

Referring now to the drawings in which like elements are labelled by like numerals, an industrial sewing machine, of which the sewing head 1 and the table 2 are shown only schematically in FIG. 1, is equipped with an electronic control device which controls the sewing head 1, its drive and the additional devices (not shown) such as thread cutter, label placement apparatus, stacker and the like.

As shown in FIG. 4, that electronic control device includes a microprocessor 3, an EPROM 4, i.e. a programmable fixed value memory capable of being erased, a read/write memory 5 which will be referred to hereinafter as RAM, a non-battery-buffered, non-volatile read/write memory 6 which will be referred to hereinafter as NOV-RAM and a display device 7, which, in the examplary embodiment, is a 32 character LCD display.

The portion of the control device necessary to direct the sewing head 1 and its drive, as well as the additional devices are designated generally with the reference numeral 8. As shown in FIG. 4, the above-described components of the control device, with the exception of the NOV-RAM 6, are connected with each other in a permanent circuit by means of a control bus 9, a data bus 10 and an address bus 11.

Figure 3:
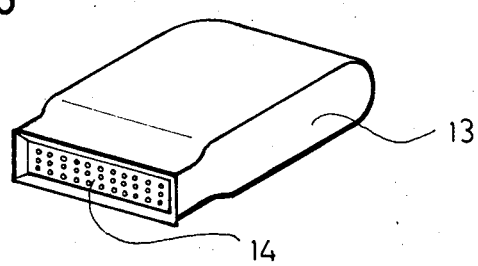
FIG. 3 is a perspective view of the cassette viewed toward the side having the plug connector elements.

In contrast, the NOV-RAM can be connected to and separated from the above-described buses by means of a 25-pole plug connection, which is designated generally by reference numeral 12, because the NOV-RAM 6 is arranged in a cassette 13, which, as shown in FIG. 3, has an essentially rectangular plastic housing. One narrow side of that housing includes 25 plug sockets 14 of the plug connector 12.

Figure 2:
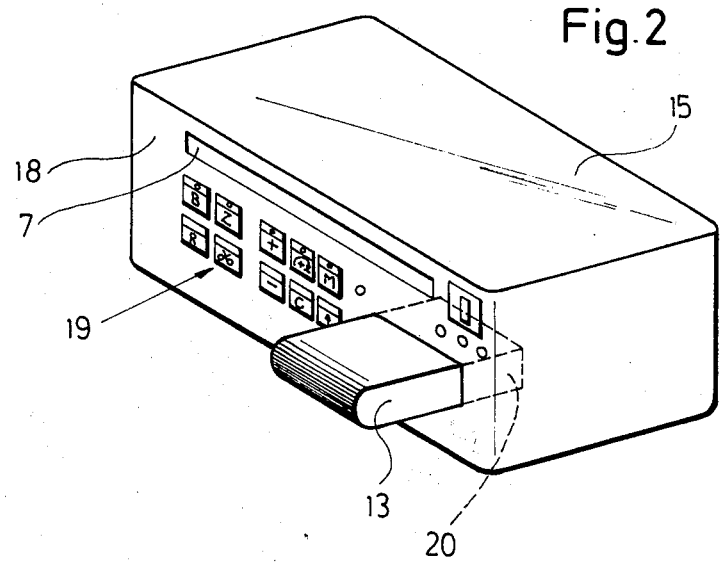
FIG. 2 is a perspective view of a portion of the control device connected to the sewing machine with a cassette inserted into its receptacle.

The microprocessor 3, the EPROM 4, the RAM 5, the display 7 and the drive portion 8 are contained in a housing 15, which, as shown in FIG. 1, is supported in the exemplary embodiment by a holder 16 connected to the table 2. Control lines 17 lead from the housing 15 to the sewing head 1, to its drive and to the additional devices. As shown particularly in FIG. 2, the front plate 18 of the housing 15 supports the display 7.

In addition, the front plate 18 supports a keyboard 19 which is also connected to the buses 8, 10, and 11. The commands necessary for the programming and control can be entered by means of the keys of the keyboard 19. Also, the front plate 18 is provided with an access opening for a cassette receptacle 20, the shape and size of which are adapted to the cassette 13, and which contains 25 recessed plug pins in such an arrangement that those pins penetrate into the plug sockets 14 when the cassette 13 is introduced into the cassette receptacle 20 and thereby connect the NOV-RAM 6 to the buses 9, 10, and 11.

The NOV-RAM 6 also contains a memory element, in which the program steps for a given article are stored without the different stitch counts used for different sizes of clothing. The NOV-RAM 6 also contains several groups of memories and counters, such that one counter is associated with each memory. Each memory group is associated with one of the program steps. A memory of a given group contains the various stitch counts for the different clothing sizes of the article concerned.

In order to sew a given article, the cassette 13, in whose NOV-RAM 6 the associated sewing program is stored, is inserted into the cassette receptacle 20. The selection of the memory in which the stitch counts for the clothing size of the article to be sewn is stored is made by entering the clothing size by means of the keyboard 19. Thus, during the course of running the program, only the stitch counts belonging to the desired clothing size will be interrogated from those memories. The correpsonding stitch counts are counted by means of the counters, so that when the interrogated stitch count is reached, the next successive command is released.

In making a transition to a different clothing size of the same article, one need only enter or select the new clothing size by means of the keyboard 19 prior to beginning the first program step.

It is also possible to program the NOV-RAM 6 on a sewing machine with the aid of the keyboard 19, when the associated cassette is inserted into the cassette receptacle 20. It is more advantageous, however, to program it by using a separately provided programming device 21, of which only the front plate, the keyboard 22, the display 27 and the two access openings 23 and 24 of two cassette receptacles are illustrated in FIG. 5. Those openings 23 and 24 are formed like the cassette receptacle 20. The programming device 21 contains a microprocessor and the necessary memory. Its keyboard 22 differs from the keyboard 19 by the addition of a numeral block 25 for the entry of numbers and by a key 26 to enter a copy command.

To program, a cassette 13 is inserted into the cassette receptacle which is accessible through the access opening 23. To copy the program from one cassette to another cassette a second cassette is inserted into the access opening 24 associated with the second cassette receptacle.

Although only a preferred embodiment is specifically illustrated and described herein, it will be appreciated that many modifications and variations of the present invention are possible in light of the above teachings and within the purview of the appended claims without departing from the spirit and intended scope of the invention.

I claim:

1. An electronic control device for industrial sewing machines, comprising a housing, a microprocessor located within the housing, a programmable fixed value memory in circuit with the microprocessor, a nonvolatile read/write memory capable of connection to the housing through a socket, said read/write memory storing all program steps for sewing an article, said read/write memory comprising a number of program steps, each group consisting of a number of memories, said number of memories equalling a corresponding number of different article sizes, each memory in each group being associated with one of said article sizes, each of said article sizes corresponding to a different stitch number, means detachably connecting said read/write memory to the housing of the control device, and a display and entry keyboard located on a front plate of said housing, wherein the keyboard is used to enter a sign of the article size so that the microprocessor reads out of the corresponding memory a number corresponding to a selected article size.

2. The electronic control device according to claim 1, wherein the read/write memory is arranged in a cassette provided with plug connector elements and the control device further includes a cassette receptacle having plug receptacle elements shaped and arranged to correspond with said plug connector elements.

3. The electronic control device according to claim 1, wherein the read/write memory is a non-buffered NOV-RAM.

4. The electronic control device according to claim 1, wherein the read/write memory comprises at least one group of memories to store a plurality of stitch counts for different clothing sizes, any one of which can be selected with the aid of said entry keyboard.

5. The electronic control device according to claim 4, wherein the number of memories associated with a single group is at least equal to the number of different clothing sizes of a single article.

6. The electronic control device according to claim 4, wherein the read/write memory includes a plurality of memory groups which corresponds to the maximum number of program steps to be performed.

7. The electronic control device according to claim 4, wherein at least one counter is associated with the memories which serve to store the stitch counts.

8. The electronic control device according to claim 2, wherein the cassette receptacle has an access opening in a front plate of a housing arranged on the sewing machine, which front plate also includes said display and entry keyboard.

9. The electronic control device according to claim 1, further including a programming device having a first cassette receptacle formed to receive a first read/write memory.

10. The electronic control device according to claim 9, further comprising a second cassette receptacle formed to receive a second read/write memory to perform a copying process.

* * * * *

UNITED STATES PATENT AND TRADEMARK OFFICE
CERTIFICATE OF CORRECTION

PATENT NO. : 4,703,432

DATED : October 27, 1987

INVENTOR(S) : ERNST MÜLLER

It is certified that error appears in the above-identified patent and that said Letters Patent is hereby corrected as shown below:

Column 3, line 35, after "NOV-RAM" insert --6--;

Column 4, line 14, "correpsonding" should be --corresponding--.

Claim 1, line 58, after "number" insert --of memory groups corresponding to a maximum number--.

Signed and Sealed this

Twelfth Day of April, 1988

*Attest:*

DONALD J. QUIGG

*Attesting Officer*   *Commissioner of Patents and Trademarks*